United States Patent
Mukherjee et al.

(10) Patent No.: US 11,181,877 B2
(45) Date of Patent: Nov. 23, 2021

(54) DYNAMIC BUILDING OCCUPANCY FORECASTING USING NON-PERSONAL REAL TIME DATA

(71) Applicant: Bank of America Corporation, Charlotte, NC (US)

(72) Inventors: Maharaj Mukherjee, Poughkeepsie, NY (US); Jennifer Cooper, Charlotte, NC (US); Jigar Shah, Franklin Township, NJ (US); Prasad G. Ravva, South Plainfield, NJ (US); Veerandra S. Srivastava, Plainsboro, NJ (US); Karthikeyan Natanasabapathy, Tamil Nadu (IN); Mohanraj Subramaniam, Plainsboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 23 days.

(21) Appl. No.: 16/815,077

(22) Filed: Mar. 11, 2020

(65) Prior Publication Data

US 2021/0286333 A1 Sep. 16, 2021

(51) Int. Cl.
*G05B 19/042* (2006.01)
*F24F 11/46* (2018.01)
*F24F 11/64* (2018.01)
*F24F 11/65* (2018.01)
*F24F 140/60* (2018.01)
*F24F 110/10* (2018.01)
(Continued)

(52) U.S. Cl.
CPC .......... *G05B 19/042* (2013.01); *F24F 11/46* (2018.01); *F24F 11/64* (2018.01); *F24F 11/65* (2018.01); *F24F 2110/10* (2018.01); *F24F 2120/12* (2018.01); *F24F 2140/50* (2018.01); *F24F 2140/60* (2018.01); *G05B 2219/2614* (2013.01)

(58) Field of Classification Search
CPC .................... G05B 2219/2614; F24F 2120/12
See application file for complete search history.

(56) References Cited

U.S. PATENT DOCUMENTS

| | | | |
|---|---|---|---|
| 8,428,918 B2 * | 4/2013 | Atrazhev | G06K 9/00778 703/2 |
| 8,510,255 B2 | 8/2013 | Fadell et al. | |
| 8,653,968 B2 | 2/2014 | Brown et al. | |

(Continued)

*Primary Examiner* — Rocio Del Mar Perez-Velez
*Assistant Examiner* — Yvonne Trang Follansbee
(74) *Attorney, Agent, or Firm* — Banner & Witcott, Ltd.; Michael A. Springs

(57) ABSTRACT

Aspects of the disclosure relate to using machine learning techniques for dynamic occupancy prediction. A computing platform may receive first data that is non-personalized and is associated with a first specific physical space, and may receive second data associated with a second specific physical space. The computing platform may normalize, for a common subspace of the first specific physical space and the second specific physical space, the first data and the second data. Using the normalized data, the computing platform may generate a predicted occupancy value for the common subspace. The computing platform may send commands directing a local HVAC control system, deployed at the common subspace, to perform a resource control action for the common subspace, which may cause the local HVAC control system to perform the resource control action for the common subspace.

14 Claims, 10 Drawing Sheets

(51) Int. Cl.
*F24F 120/12* (2018.01)
*F24F 140/50* (2018.01)

(56) References Cited

U.S. PATENT DOCUMENTS

| | | |
|---|---|---|
| 8,788,448 B2 | 7/2014 | Fadell et al. |
| 9,176,485 B2 | 11/2015 | Krumm et al. |
| 9,245,229 B2 | 1/2016 | Fadell et al. |
| 9,447,983 B2 | 9/2016 | Smith et al. |
| 9,921,750 B2 | 3/2018 | Ghosh |
| 10,153,113 B2 | 12/2018 | Richardson et al. |
| 10,386,795 B2 | 8/2019 | Vega |
| 10,390,364 B2 | 8/2019 | Hall et al. |
| 10,393,398 B2 | 8/2019 | Steinberg |
| 10,395,196 B2 | 8/2019 | Fife |
| 10,410,153 B2 | 9/2019 | Fife |
| 10,443,873 B1 | 10/2019 | Johnson et al. |
| 10,452,037 B2 | 10/2019 | Hunt et al. |
| 10,454,702 B2 | 10/2019 | Shetty et al. |
| 10,484,201 B2 | 11/2019 | Agrawal et al. |
| 10,534,382 B2 | 1/2020 | Steinberg |
| 2010/0299116 A1* | 11/2010 | Tomastik ............ G06K 9/00785 703/2 |
| 2012/0072187 A1 | 3/2012 | Irving et al. |
| 2016/0004237 A1* | 1/2016 | Mohan ................... G05B 15/02 700/275 |
| 2018/0089143 A1 | 3/2018 | Sullivan |
| 2018/0299846 A1* | 10/2018 | Ray ........................ G06Q 10/06 |
| 2021/0003308 A1* | 1/2021 | Venne ...................... F24F 11/62 |
| 2021/0080915 A1* | 3/2021 | Yan ........................ G05B 15/02 |

\* cited by examiner

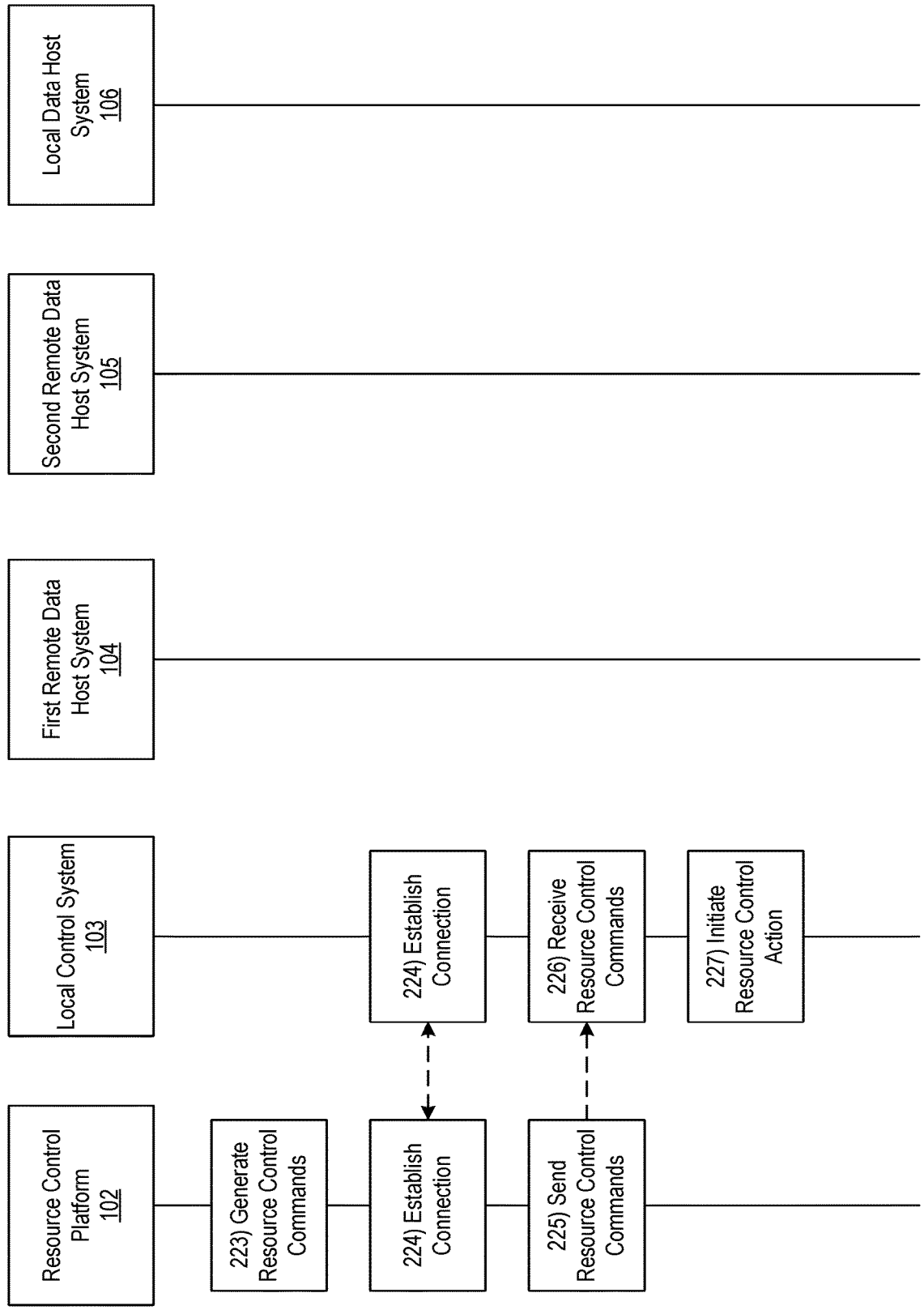

405

Janitorial Dispatch Interface

Please head to the 11th floor and work your way down to the ground level.

Law Enforcement Dispatch Interface

Please relocate to the North East quadrant of the city between 5th and 10th streets. Click here for navigational guidance.

FIG. 5

DYNAMIC BUILDING OCCUPANCY FORECASTING USING NON-PERSONAL REAL TIME DATA

BACKGROUND

Aspects of the disclosure relate to control systems, such as control systems for heating and cooling systems deployed in building structures. In particular, one or more aspects of the disclosure relate to computing platforms that implement machine learning methods in performing occupancy prediction and controlling building structure systems.

In some cases, energy costs for enterprise organizations (e.g., financial institutions, or the like) may be one of their largest corporate expenditures. In some cases, building occupancy may provide an indicator for settings, functionality, or the like of energy systems (e.g., HVAC, or the like). In some instances, sensors (e.g., cameras, infrared, or the like) may be installed for the purpose of determining such building occupancy. Additionally or alternatively, personalized data may be used for the purpose of determining such building occupancy (e.g., radio frequency identification (RFID) cards, global positioning system (GPS) tracking, or the like). In some instances, however, implementation of such methods for determining building occupancy may result in high costs and/or concerns regarding safety, security, privacy, or the like. Additionally or alternatively, such methods may result in inaccurate occupancy predictions resulting from sensor failures. As a result, it may be difficult for enterprise organizations to forecast building occupancy for energy usage, which may result in inefficient usage and/or operations of HVAC systems and/or other building systems and/or resources.

SUMMARY

Aspects of the disclosure provide effective, efficient, scalable, and convenient technical solutions that address and overcome the technical problems associated with controlling building structure systems. For example, some aspects of the disclosure provide techniques that may enable computing devices to control building structure systems by automatically forecasting a predicted occupancy value in methods that do not rely on personalized data or sensors installed for the prediction of occupancy. In doing so, various technical advantages may be realized. For example, one technical advantage of using sensor-free, non-personalized data for occupancy prediction is that sensors are not relied on (e.g., as sensors may be expensive and may break/need to be replaced, thus adding to additional cost and/or resulting in inaccurate sensor data/occupancy predictions). Similarly, use of such sensor data may result in computationally intensive calculations for occupancy predictions. Another technical advantage is that these methods are operable in jurisdictions, localities, or the like that restrict the use of RFID/GPS data for the safety, security, and/or privacy of individuals (e.g., because non-personalized data is used in the methods described herein). Accordingly, one or more methods described herein provide a computationally fast and inexpensive real time method for determining occupancy of a physical space for heating, ventilation, and air conditioning (HVAC) and/or other energy usage planning, which does not rely on individuals personalized data.

In accordance with one or more embodiments of the disclosure, a computing platform comprising at least one processor, a communication interface, and memory storing computer-readable instructions may receive first data from a first data source, where the first data is non-personalized and is associated with a first specific physical space. The computing platform may receive second data from a second data source, where the second data is non-personalized and is associated with a second specific physical space. For a common subspace of the first specific physical space and the second specific physical space, the computing platform may normalize the first data and the second data. Using the normalized data, the computing platform may generate a predicted occupancy value for the common subspace of the first specific physical space and the second specific physical space. Subsequently, the computing platform may send one or more commands directing a local heating, ventilation, and air conditioning (HVAC) control system, deployed at the common subspace of the first specific physical space and the second specific physical space, to perform a resource control action for the common subspace of the first specific physical space and the second specific physical space, which may cause the local HVAC control system to perform the resource control action for the common subspace of the first specific physical space and the second specific physical space.

In one or more instances, the one or more commands directing the local HVAC control system to perform the resource control action for the common subspace of the first specific physical space and the second specific physical space may be commands directing the HVAC control system to adjust an HVAC setting for the common subspace of the first specific physical space and the second specific physical space. In one or more instances, the computing platform may receive third data from a third data source, where the third data is non-personalized and is associated with a third specific physical space.

In one or more instances, the computing platform may generate the predicted occupancy value for the common subspace of the first specific physical space and the second specific physical space by computing a value of $V_{op}$ using the following equation:

$$V_{op} = \left(\left(\frac{\alpha X + \beta Y + \gamma Z}{n}\right) + 1\right) * M,$$

where: $\alpha$ is a first weight value, X is a percent difference between the first data and a historical average for the first data, $\beta$ is a second weight value, Y is a percent difference between the second data and a historical average for the second data, $\gamma$ is a third weight value, Z is a percent difference between the third data and a historical average for the third data, n is a number of data sources, and M is a baseline occupancy factor for the common subspace of the first specific physical space and the second specific physical space. In one or more instances, the computing platform may receive a feedback message from the local HVAC control system, and may dynamically tune $\alpha$, $\beta$, and $\gamma$ based on the feedback message.

In one or more instances, the first data may be weather data, the second data may be traffic data, and the third data may be elevator data. In one or more instances, the common subspace of the first specific physical space and the second specific physical space may be a floor in a commercial building. In one or more instances, the computing platform may send one or more additional commands directing another local control system to send alerts to enterprise computing devices corresponding to one or more individuals, which may cause dispatch of the one or more individuals within the common subspace of the first specific physical space and the second specific physical space based on the predicted occupancy value.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing machine learning techniques for dynamic occupancy forecasting in accordance with one or more example embodiments;

FIGS. 4 and 5 depict graphical user interfaces for implementing machine learning techniques for dynamic occupancy forecasting in accordance with one or more example embodiments.

DETAILED DESCRIPTION

Figure 1A:
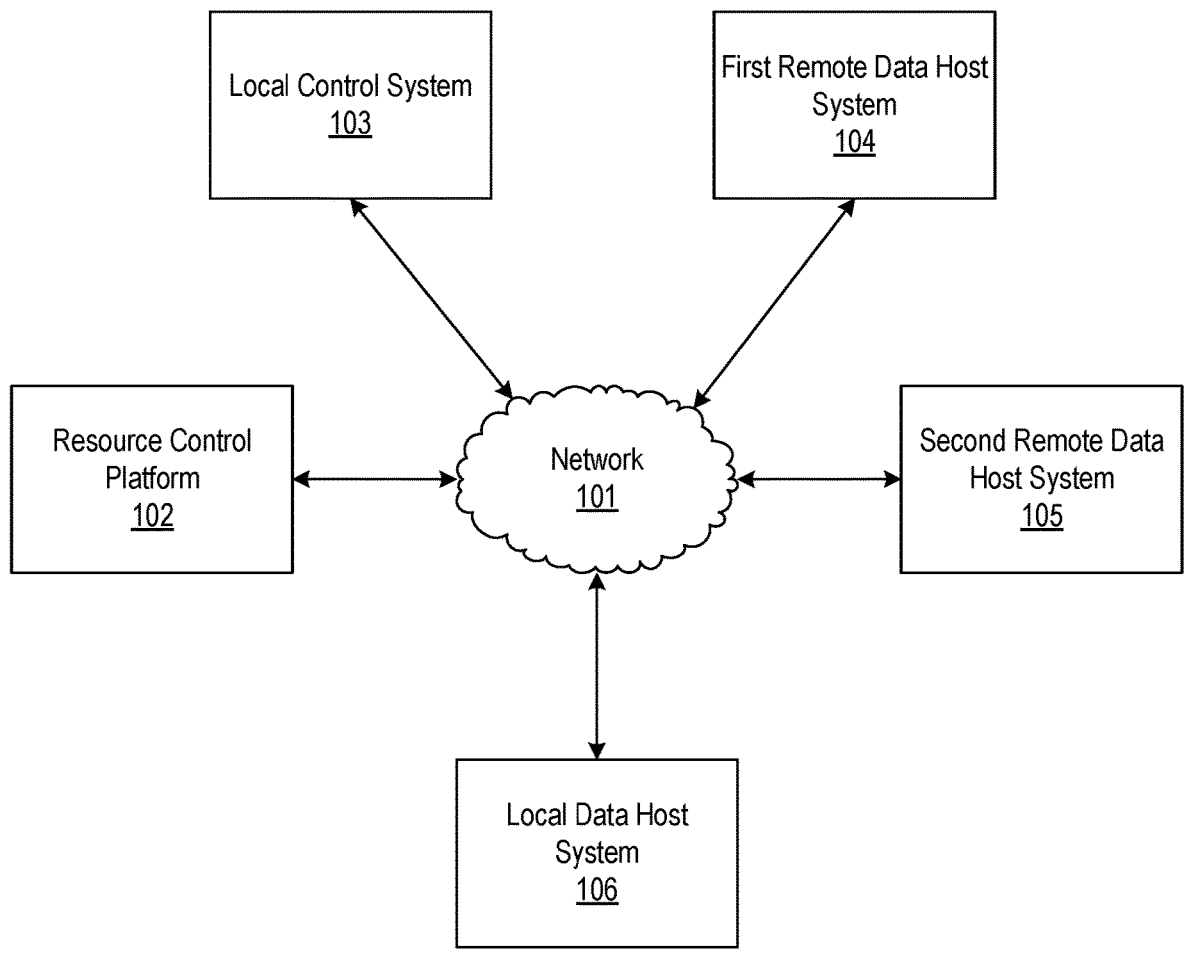
FIGS. 1A-1B depict an illustrative computing environment for implementing machine learning techniques for dynamic occupancy forecasting in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure provide systems and methods to efficiently and effectively forecast building occupancy values using non-personalized data. For example, energy use in buildings (both commercial and residential) may account for a significant portion of total energy use, especially in concentrated urban areas, which are set to rapidly expand in the near future. For enterprise organizations (e.g., financial institutions, or the like), the annual energy bill in their buildings may constitute a significant operation cost. For most buildings, occupant presence and behavior have a decisive impact on building energy use.

The occupancy of a building may be computed at many levels of granularity of both time and space. For example, a manager may be interested in which particular desks are occupied and/or how often each desk is occupied. With regard to the forecasting of energy consumption in a building, however, such levels of granularity or accuracy might not be needed. Rather, for energy consumption and HVAC usage, it might not be necessary to know precisely who is where at particular times. In these instances, it may be computationally relevant merely to know how much of a given area such as a floor space, building, or the like is being occupied. In the context of heating, ventilation, and air conditioning (HVAC) units, these units do not operate based on a precise presence or absence of individuals, and thus it might not be necessary to know occupation levels of a floor space, building, or the like to a precise degree. Rather, a rough estimate within 10-15% of an actual occupation value may be good enough to identify settings, functioning, or the like related to HVACs in a building. Similarly, with regard to safety, security, and privacy of individuals, it may be prohibited or undesirable to track the presence and/or absence of a particular person in a particular place.

There are some conventional approaches that may be used to determine building occupancy. For example, sensor based methods may use camera or infrared sensors such as motion detectors to determine how many people are at a certain location or floor of a building. Although these methods are highly accurate in determining whether certain parts of the building are occupied or not, these methods may be very expensive. For example, the procurement and installation of the sensors may be expensive. Furthermore, the sensors may lose their accuracy over time, and might need to be replaced again thus costing additional money in procurement and installations. In addition, the accuracy level of these sensors may be higher than needed for an energy consumption model.

Another approach may use radio frequency identification (RFID) cards that an employee used to enter a building or floor. These trackers might only be used at an entrance, however, and might not be used during the exit from a floor or a building. Accordingly, they may provide only a rough estimate of building occupancy. Furthermore, since these RFID cards identify a person individually, there may be concerns of safety, security, and/or privacy for using that information in building occupancy determination. For example, localities and jurisdictions may restrict usage of identified data for purposes other than its single intended purpose (e.g., building access, or the like).

Yet another approach may mobile data. For example, a method implementing this approach may compute occupancy of buildings by tracking people based on their global positioning system (GPS) enabled mobile phones or using Bluetooth pairing. This method might not require installation of expensive sensor networks as described above with regard to the sensor based/RFID methods, however, this method may use personal data such as the location of a cellular device. Accordingly, such methods might not be useful in certain jurisdictions now or in the future (e.g., due to safety, security, and/or privacy concerns).

Aspects of the disclosure provide advantages over one or more conventional approaches by providing a method for building occupancy determinations that is computationally fast, inexpensive, and operates in real time, for the purpose of HVAC and other energy usage planning and control and that does not use personalized data for individuals. In particular, one or more of the systems and methods described herein estimate building occupancy in real time using machine learning and artificial intelligence based techniques that use non-personalized data such as real time transportation or traffic data that is readily available from various departments of transportation, weather data, or the like. By using such data, one or more of the systems and methods described herein may provide an estimate of building occupancy that is accurate enough for the purpose of HVAC and other energy usage planning and control and does not use personalized data of individuals for operation.

Furthermore, one or more of the systems and methods described herein may take into consideration additional data such as elevator usage, electricity usage, water usage, or the like at a level of granularity associated with a building, floor level, or the like. Such data may be available in real time and might not identify anyone individually.

As described further below, one or more of the systems and methods described herein may use historically available data to create a model, and then use the model for future prediction of building occupancy. For example, weather data is usually available within 10 km by 10 km to 1 km by 1 km granularity, and usually at an hourly basis. In some instances, weather may be a deciding factor of building occupancy. For example, in extreme or inclement weather, people may stay inside, work from home, or the like. In contrast, in sunny weather, people may stay outdoors longer. By using machine learning modeling, weather data may be correlated to building and/or floor level occupancy modeling.

Similarly, transportation and/or traffic data may be available within a spatial granularity of 1 km by 1 km to a street or city block such as 30 m by 30 m. This data may be available in real time with a minute granularity for updates from various localized sensors used by departments of transportation. Transportation or mobility data denoting where and when people are going may have a direct correlation to building occupancy. For example, when more people are traveling towards downtown on a weekday at rush hour it may indicate that office buildings will be more occupied. In some instances, such transportation and/or traffic data may be correlated not only to building occupancy, but to floor or area level occupancy as well.

Electricity usage may be available at granularity levels of a city block as well as building or floor levels, and may be used almost in real time based on digital and internet enabled meters. Electricity usage of a building or a floor area may be correlated to the occupancy of that part of the building. For example, people occupying the building may use lights and computers or other appliances while occupying them.

Water usage may be obtained at building levels and sometimes at floor levels depending on the location of a water meter. Water meters may be digital and connected to the internet for a read out. In some instances, water usage of a building or a floor area may be correlated to occupancy of that part of the building. For example, people occupying the building may use water for flushing toilets, drinking water, or the like.

Elevator usage, start floors, stop floors, or the like may denote which floors are being occupied and which floors are being emptied. In some instances, several people may get in and out of an elevator at any floor, and this may be used to predict floor or area level occupancy.

In some instances, a repository of building occupancy data may be available for general study. If such data is not available for a particular building or floor, building and/or floor data for a similarly situated building and/or floor may be used instead. In some instances, the above described data may be available on appropriate sites for historical data.

In one or more instances, a linear regression model for machine learning may be used to predict building occupancy data at either a building or floor level using one or more types of non-personal data as described above. Each data set may be scaled to an appropriate level of granularity. For example, if a collection of weather data is available for a whole city block, this data may be used for prediction of any building and/or floor on that block. As another example, if occupancy of a particular building is being determined (rather than individual floors), elevator data might not be used and a dimension of the computation may be reduced.

In some instances, appropriate error and bias are chosen in the machine learning model so that the data is neither over fitted or under fitted. The model may be iteratively refined for an appropriate level of precision, recall, and/or other metrics of a machine learning model. In some instances, the model may be further improved by combining several predictors by polling and calculating an average of all the predictions for model stability. In some instances, the model may incorporate randomization techniques such as boosting, bagging, random forest, or the like. In some instances, the model may be further improved by incorporating more recent data as it becomes available.

Accordingly, by performing one or more of the methods described above, one or more of the systems described herein may compute a building occupancy based on data that is non-personal and does not identify any person individually. In doing so, one or more of the systems and methods described herein might not need any special data masking or encryption techniques because none of the collected data depends on identifying a particular individual (e.g., by camera, device identification and/or interrogation, mobile data, or the like). Furthermore, one or more of the methods described herein might not require installation of physical sensors (e.g., motion detectors, cameras, RFID scanners, or the like), and may use available data that already exists for an estimation of building occupancy. In these instances, rather than computing a precise determination of who is in a particular location at a particular time, one or more of the systems and methods described herein perform an inexpensive computation for a rough estimation that is satisfactory for energy management for HVAC planning and operation.

Figure 1B:
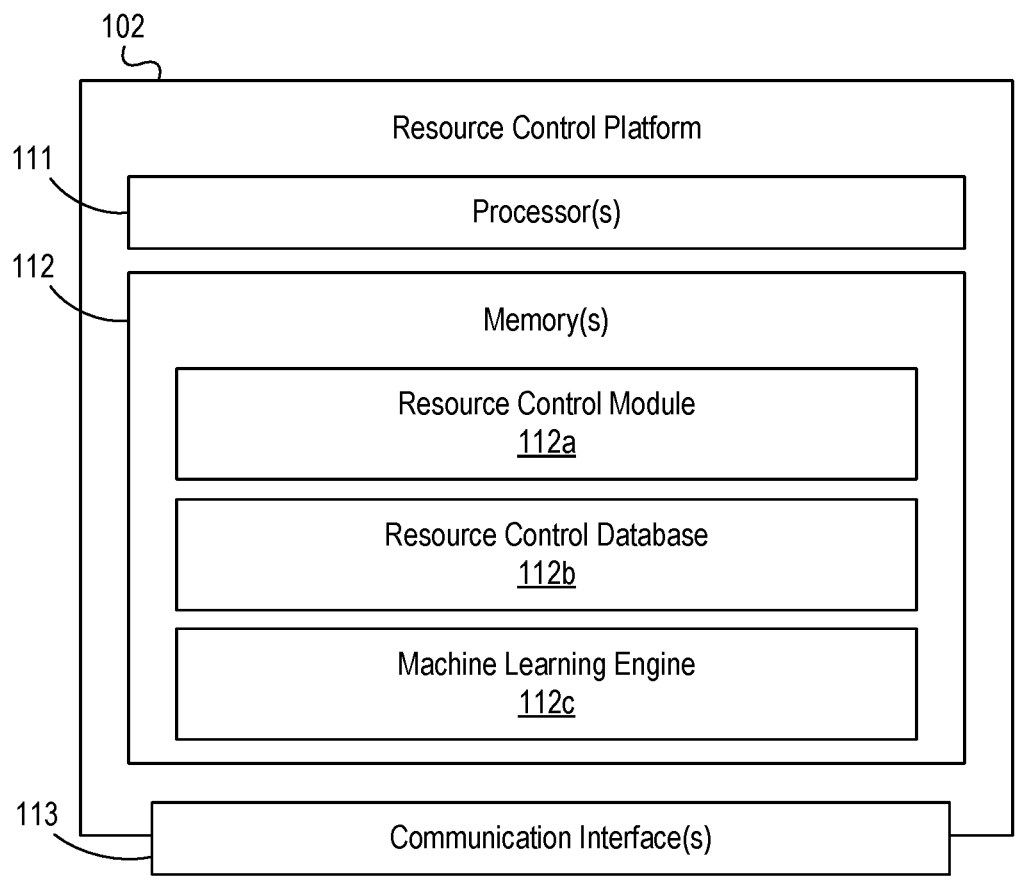

FIGS. 1A-1B depict an illustrative computing environment that implements machine learning techniques for dynamic occupancy forecasting in accordance with one or more example embodiments. Referring to FIG. 1A, computing environment 100 may include one or more computer systems. For example, computing environment 100 may include a resource control platform 102, a local control system 103, a first remote data host system 104, a second remote data host system 105, and a local data host system 106.

As described further below, resource control platform 102 may be a computer system that includes one or more computing devices (e.g., servers, server blades, or the like) and/or other computer components (e.g., processors, memories, communication interfaces) that may be used to implement machine learning models to compute a predicted occupancy value for a specific location (e.g., building, floor, room, section of town, or the like). In some instances, the resource control platform 102 may be configured to maintain a dynamic table containing baseline occupancy values for various locations under baseline conditions (e.g., standard traffic, standard temperature, or the like), and may further be configured to adjust these baseline values based on feedback received for various occupancy predictions. Similarly, the resource control platform 102 may be configured to maintain a plurality of weight values associated with various data types, and may be configured to dynamically adjust the weight values based on feedback received for various occupancy predictions.

Local control system 103 may be a server, server blade, or the like configured to control a local system (e.g., HVAC, lighting, or the like). In some instances, local control system may be an enterprise user device (e.g., a desktop computer, laptop computer, tablet, mobile device, or the like) configured to direct human resources (e.g., provide alerts, notifications, messages, or the like to computing devices associated with employees of an enterprise organization).

First remote data host system 104 may be a server, server blade, or the like configured to store data associated with an area larger than the particular location for which an occupancy prediction is being made. For example, first remote data host system 104 may be configured to store weather data, traffic data, transportation data, or the like, and may be configured to provide this data to the resource control platform 102 upon request. In some instances, the data stored at the first remote data host system 104 may be non-personalized data.

Second remote data host system 105 may be a server, server blade, or the like configured to store data associated with an area larger than the particular location for which an occupancy prediction is being made. For example, second remote data host system 105 may be configured to store weather data, traffic data, transportation data, or the like, and may be configured to provide this data to the resource control platform 102 upon request. In some instances, the second remote data host system 105 may be configured to store different data than the first remote data host system 104 (e.g., first remote data host system 104 may store weather data and second remote data host system 105 may store traffic data, or the like). In some instances, the data stored at the second remote data host system 105 may be non-personalized data.

Local data host system 106 may be a server, server blade, or the like configured to store data associated with the particular location for which an occupancy prediction is being made. For example, local data host system 106 may be configured to store data for a particular building such as elevator data, electricity data, water data, or the like, and may be configured to provide this data to the resource control platform 102 upon request. In some instances, the data stored at the local data host system 106 may be non-personalized data.

Computing environment 100 also may include one or more networks, which may interconnect resource control platform 102, local control system 103, first remote data host system 104, second remote data host system 105, local data host system 106, or the like. For example, computing environment 100 may include a network 101 (which may interconnect, e.g., resource control platform 102, local control system 103, first remote data host system 104, second remote data host system 105, local data host system 106, or the like).

In one or more arrangements, resource control platform 102, local control system 103, first remote data host system 104, second remote data host system 105, and local data host system 106 may be any type of computing device capable of sending and/or receiving requests and processing the requests accordingly. For example, resource control platform 102, local control system 103, first remote data host system 104, second remote data host system 105, local data host system 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of resource control platform 102, local control system 103, first remote data host system 104, second remote data host system 105, and local data host system 106 may, in some instances, be special-purpose computing devices configured to perform specific functions.

Referring to FIG. 1B, resource control platform 102 may include one or more processors 111, memory 112, and communication interface 113. A data bus may interconnect processor 111, memory 112, and communication interface 113. Communication interface 11 may be a network interface configured to support communication between resource control platform 102 and one or more networks (e.g., network 101, or the like). Memory 112 may include one or more program modules having instructions that when executed by processor 111 cause resource control platform 102 to perform one or more functions described herein and/or one or more databases that may store and/or otherwise maintain information which may be used by such program modules and/or processor 111. In some instances, the one or more program modules and/or databases may be stored by and/or maintained in different memory units of resource control platform 102 and/or by different computing devices that may form and/or otherwise make up resource control platform 102. For example, memory 112 may have, host, store, and/or include resource control module 112a, resource control database 112b, and a machine learning engine 112c.

Resource control module 112a may have instructions that direct and/or cause resource control platform 102 to execute advanced machine learning techniques related to occupancy forecasting and resource control, as discussed in greater detail below. Resource control database 112b may store information used by resource control module 112a and/or resource control platform 102 in application of machine learning techniques related to occupancy forecasting and resource control, and/or in performing other functions. Machine learning engine 112c may have instructions that direct and/or cause the resource control platform 102 to set, define, and/or iteratively refine optimization rules and/or other parameters used by the resource control platform 102 and/or other systems in computing environment 100.

Figure 2A:
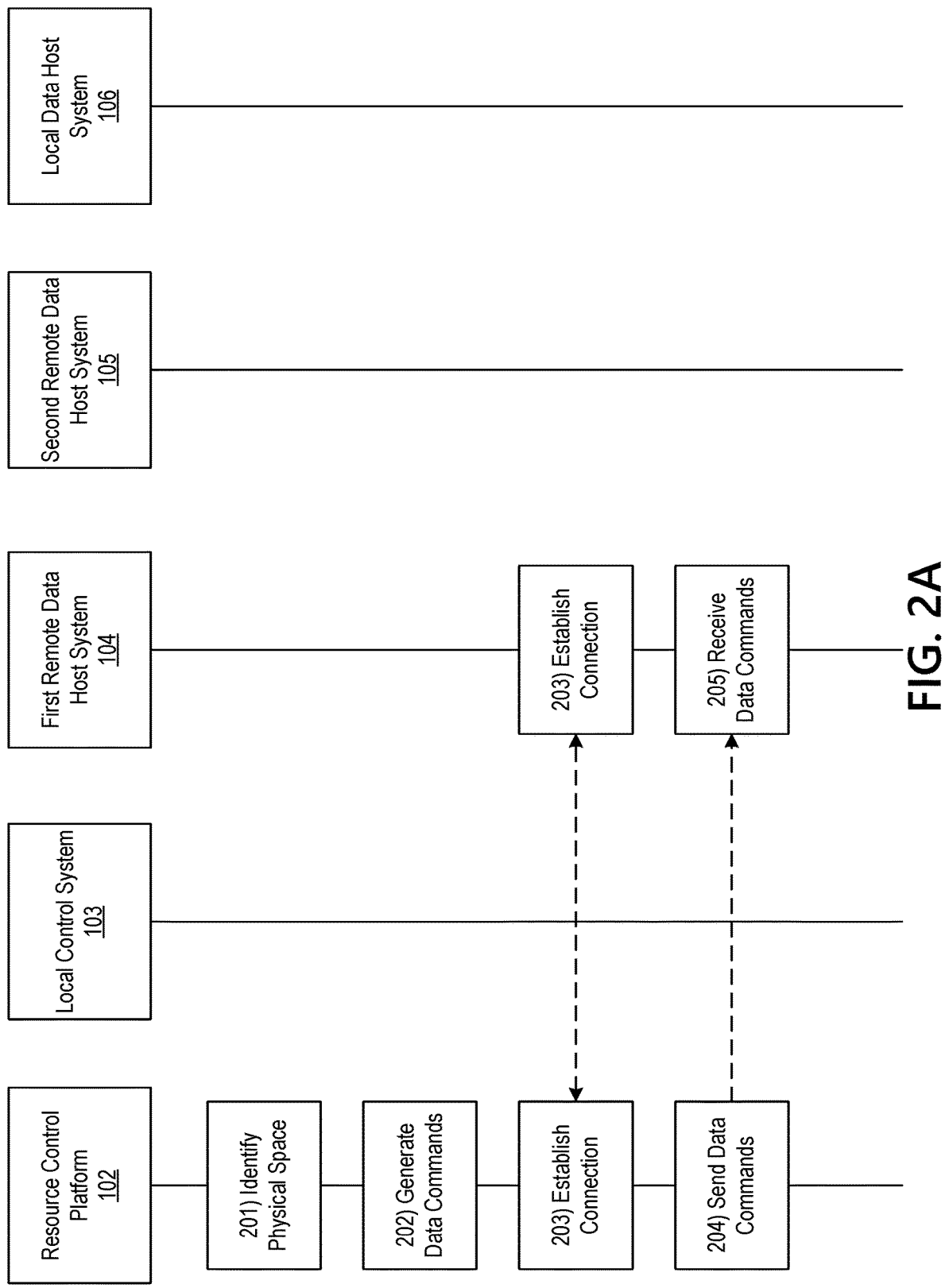

FIGS. 2A-2F depict an illustrative event sequence that implements machine learning techniques for dynamic occupancy forecasting in accordance with one or more example embodiments. Referring to FIG. 2A, at step 201, resource control platform 102 may identify a physical space for which occupancy should be forecast. For example, resource control platform 102 may identify a building (commercial or residential), floor, room, part of town, or the like for which occupancy should be forecast. In some instances, the resource control platform 102 may identify the physical space based on a preconfigured time interval (e.g., occupancy should be forecast at 6 am every weekday morning, at 9 am every weekend morning, or the like). For illustrative purposes, it may be assumed that at step 201, the resource control platform 102 identified the 11th floor of a particular commercial building as the physical space.

At step 202, the resource control platform 102 may generate one or more commands directing one or more data sources (e.g., first remote data host system 104, second remote data host system 105, local data host system 106, or the like) to provide data corresponding to the physical space identified at step 201. For example, the resource control platform 102 may generate one or more commands directing the first remote data host system 104, the second remote data host system 105, and/or the local data host system 106 to provide data corresponding to the 11th floor of the commercial building identified in step 201.

At step 203, the resource control platform 102 may establish a connection with the first remote data host system 104. For example, the resource control platform 102 may establish a first wireless data connection with the first remote data host system 104 to link the resource control platform 102 with the first remote data host system 104. In one or more instances, the resource control platform 102 may identify whether or not a connection is already established with the first remote data host system 104. If a connection is already established with the first remote data host system 104, the resource control platform 102 might not re-establish the connection. If a connection is not already established, however, the resource control platform 102 may establish the first wireless data connection as described herein.

At step 204, the resource control platform 102 may send the one or more commands directing the first remote data host system 104 to provide data corresponding to the physical space. In one or more instances, the resource control platform 102 may send the one or more commands directing the first remote data host system 104 to provide data corresponding to the physical space via the communication interface 113 and while the first wireless data connection is established.

At step 205, the first remote data host system 104 may receive the one or more commands directing the first remote data host system 104 to provide data corresponding to the physical space. In one or more instances, the first remote data host system 104 may receive the one or more commands directing the first remote data host system 104 to provide data corresponding to the physical space while the first wireless data connection is established.

Figure 2B:
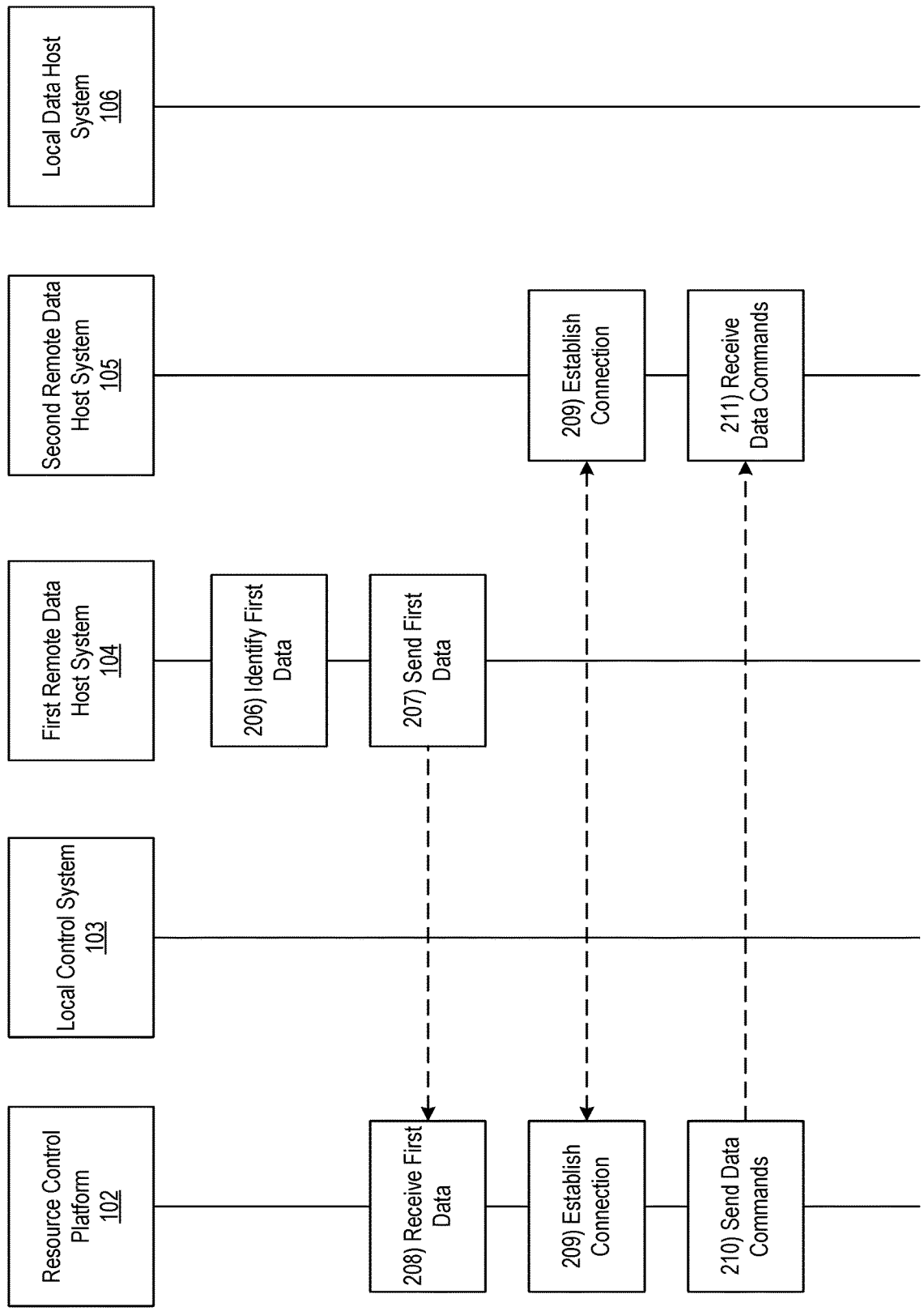

Referring to FIG. 2B, at step 206, the first remote data host system 104 may identify first data. In some instances, the first remote data host system 104 may identify the first data in response to the one or more commands directing the first remote data host system 104 to provide data corresponding to the physical space. For example, in some instances, the one or more commands directing the first remote data host system 104 to provide data corresponding to the physical space may include information corresponding to the physical space (e.g., GPS coordinates, an address, or the like). In these instances, the first remote data host system 104 may access a first stored database that includes correlations between the first data and physical spaces, and may identify the first data corresponding to the physical space by performing a lookup function. For example, the first remote data host system 104 may perform a lookup on a zip code associated with the 11th floor of the commercial building, and may identify weather data (e.g., temperature, wind speed, precipitation, or the like) corresponding to that address. In some instances, the first data identified by the first remote data host system 104 may correspond to an area larger than the physical space, but that includes the physical space. For example, the first remote data host system 104 may identify weather data corresponding to a zip code in which the physical space is located.

At step 207, the first remote data host system 104 may send the first data, identified at step 206, to the resource control platform 102. In one or more instances, the first remote data host system 104 may send the first data to the resource control platform 102 while the first wireless data connection is established. For example, in sending the first data, the first remote data host system 104 may send weather data corresponding to a zip code in which the identified physical space (e.g., the 11th floor of the commercial building) is located.

At step 208, the resource control platform 102 may receive the first data, sent at step 207. In one or more instances, the resource control platform 102 may receive the first data via the communication interface 113 and while the first wireless data connection is established.

At step 209, the resource control platform 102 may establish a connection with the second remote data host system 105. In one or more instances, the resource control platform 102 may establish a second wireless data connection with the second remote data host system 105 to link the resource control platform 102 to the second remote data host system 105. In some instance, the resource control platform 102 may identify whether a connection is already established with the second remote data host system 105. If a connection is already established with the second remote data host system 105, the resource control platform 102 might not re-establish the connection. If a connection is not already established with the second remote data host system 105, the resource control platform 102 may establish the second wireless data connection as described herein. Actions performed at step 209 may be similar to those described with regard to the first remote data host system 104 at step 203.

At step 210, the resource control platform 102 may send the one or more commands directing the second remote data host system 105 to provide data corresponding to the physical space. In one or more instances, the resource control platform 102 may send the one or more commands directing the second remote data host system 105 to provide data corresponding to the physical space via the communication interface 113 and while the second wireless data connection is established. Actions performed at step 210 may be similar to those described above with regard to the first remote data host system 104 at step 204.

At step 211, the second remote data host system 105 may receive the one or more commands directing the second remote data host system 105 to provide data corresponding to the physical space. In some instances, the second remote data host system 105 may receive the one or more commands directing the second remote data host system 105 to provide data corresponding to the physical space while the second wireless data connection is established. Actions performed at step 211 may be similar to those described above with regard to the first remote data host system 104 at step 205.

Figure 2C:
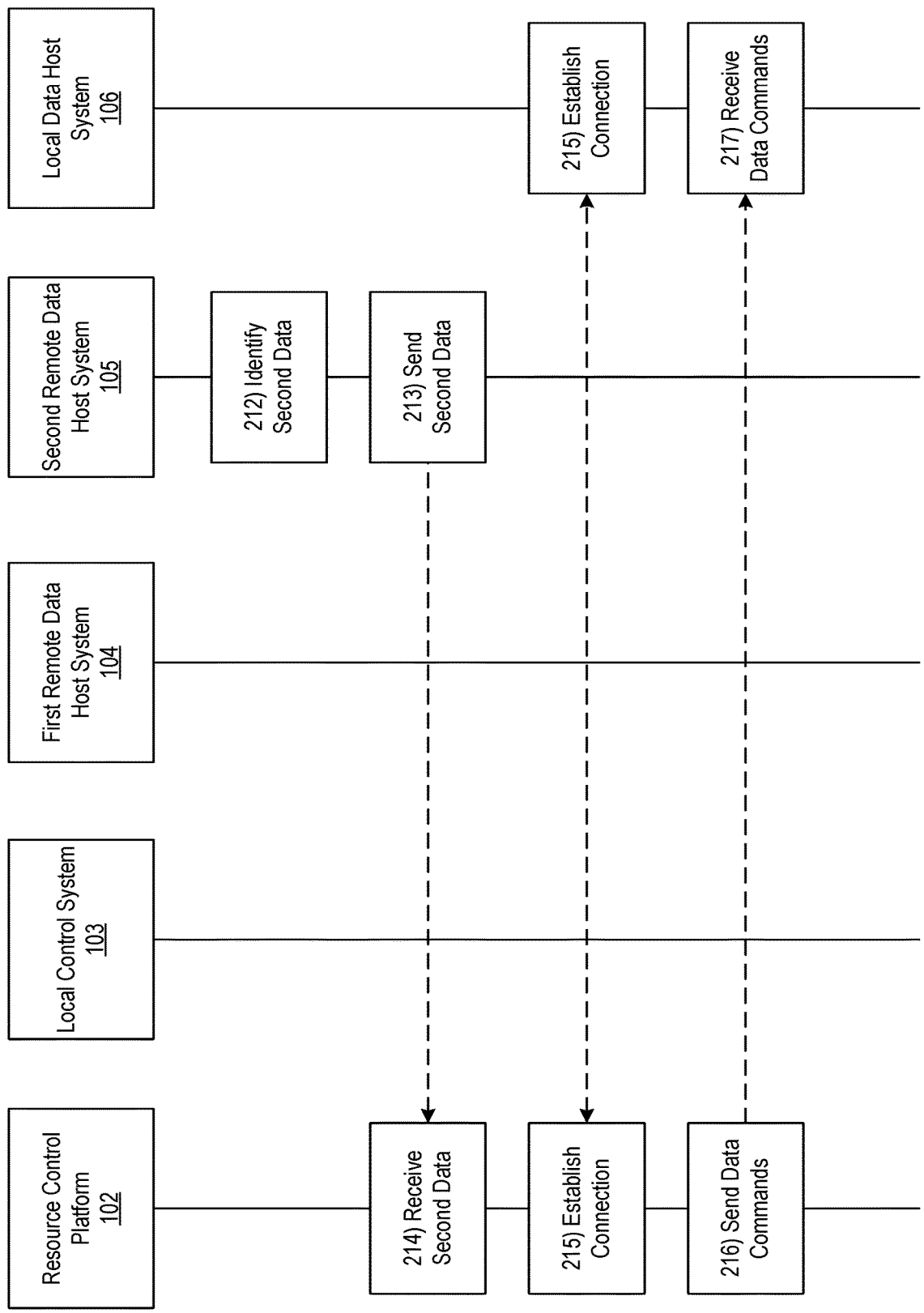

Referring to FIG. 2C, at step 212, the second remote data host system 105 may identify second data. In some instances, the second remote data host system 105 may identify the second data in response to the one or more commands directing the second remote data host system 105 to provide data corresponding to the physical space. For example, in some instances, the one or more commands directing the second remote data host system 105 to provide data corresponding to the physical space may include information corresponding to the physical space (e.g., GPS coordinates, an address, or the like). In these instances, the second remote data host system 105 may access a second stored database that includes correlations between the second data and physical spaces, and may identify the second data corresponding to the physical space by performing a lookup function. For example, the second remote data host system 105 may perform a lookup on an address associated with the 11th floor of the commercial building, and may identify traffic data (e.g., congestion, or the like) corresponding to a block on which the address is located. In some instances, the second data identified by the second remote data host system 105 may correspond to an area larger than the physical space, but that includes the physical space. For example, the second remote data host system 105 may identify traffic data corresponding to a block on which the physical space is located (e.g., there may be multiple buildings located on the same block). In these instances, the physical space may be a common subspace of the areas corresponding to the first data and the second data. Actions performed at step 212 may be similar to those described above at step 206 with regard to identification of the first data.

At step 213, the second remote data host system 105 may send the second data, identified at step 212, to the resource control platform 102. In one or more instances, the second remote data host system 105 may send the second data to the resource control platform 102 while the second wireless data connection is established. For example, in sending the second data, the second remote data host system 105 may send traffic data corresponding to a city block on which the identified physical space (e.g., the 11th floor of the commercial building) is located. Actions performed at step 213 may be similar to those described above with regard to the first data at step 207.

At step 214, the resource control platform 102 may receive the second data, sent at step 213. In one or more instances, the resource control platform 102 may receive the second data via the communication interface 113 and while the second wireless data connection is established. Actions performed at step 214 may be similar to those described above at step 208 with regard to the first data.

At step 215, the resource control platform 102 may establish a connection with the local data host system 106. For example, the resource control platform 102 may establish a third wireless data connection with the local data host system 106 to link the resource control platform 102 to the local data host system 106. In some instances, the resource control platform 102 may identify whether a connection is already established with the local data host system 106. If a connection is already established with the local data host system 106, the resource control platform 102 might not re-establish the connection. If a connection is not already established with the local data host system 106, the resource control platform 102 may establish the local data host system 106 as described herein. Actions performed at step 215 may be similar to those described above at steps 203 and 209 with regard to the first remote data host system 104 and the second remote data host system 105.

At step 216, the resource control platform 102 may send the one or more commands directing the local data host system 106 to provide data corresponding to the physical space. In one or more instances, the resource control platform 102 may send the one or more commands directing the local data host system 106 to provide data corresponding to the physical space via the communication interface 113 and while the third wireless data connection is established.

Actions performed at step 216 may be similar to those described above with regard to the first remote data host system 104 at step 204 and the second remote data host system 105 at step 210.

At step 217, the local data host system 106 may receive the one or more commands directing the local data host system 106 to provide data corresponding to the physical space. In some instances, the local data host system 106 may receive the one or more commands directing the local data host system 106 to provide data corresponding to the physical space while the third wireless data connection is established. Actions performed at step 217 may be similar to those performed at step 211 with regard to the second remote data host system 105 and at step 205 with regard to the first remote data host system 104.

Figure 2D:
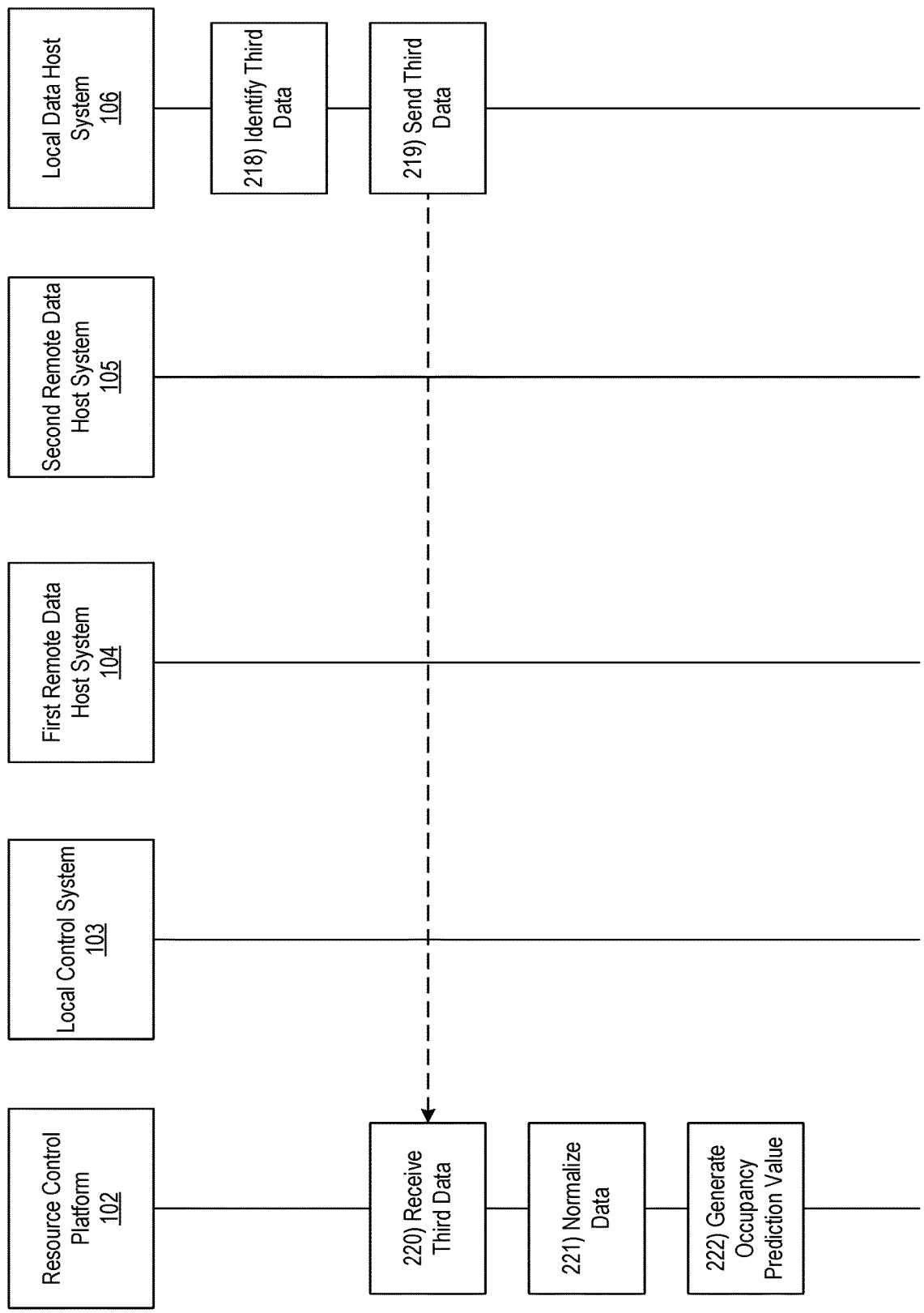

Referring to FIG. 2D, at step 218, the local data host system 106 may identify third data. In some instances, the local data host system 106 may identify the third data in response to the one or more commands directing the local data host system 106 to provide data corresponding to the physical space. For example, in some instances, the one or more commands directing the local data host system 106 to provide data corresponding to the physical space may include information corresponding to the physical space (e.g., GPS coordinates, an address, a floor, or the like). In these instances, the local data host system 106 may access a third stored database (e.g., a local database of information about a particular building) that includes correlations between the third data and physical spaces, and may identify the third data corresponding to the physical space by performing a lookup function. For example, the local data host system 106 may perform a lookup on the 11th floor of the commercial building, and may identify electricity data, water data, elevator data, or the like associated with the floor. In some instances, the third data identified by the local data host system 106 may correspond to an area larger than the physical space, but that includes the physical space. For example, the local data host system 106 may identify elevator data corresponding to a building in which a particular floor is located (e.g., elevators may access different floors in the same building). Actions performed at step 218 may be similar to those described above at step 212 with regard to the second remote data host system 105 and at step 206 with regard to the first remote data host system 104.

At step 219, the local data host system 106 may send the third data, identified at step 218, to the resource control platform 102. In one or more instances, the local data host system 106 may send the third data to the resource control platform 102 while the third wireless data connection is established. For example, in sending the third data, the local data host system 106 may send elevator data (e.g., how many times the elevators stop at each floors, or the like) corresponding to the identified physical space (e.g., the 11th floor of the commercial building). Actions performed at step 219 may be similar to those described above with regard to the first data at step 207 and the second data at step 213.

At step 220, the resource control platform 102 may receive the third data, sent at step 219. In one or more instances, the resource control platform 102 may receive the third data via the communication interface 113 and while the third wireless data connection is established. Actions performed at step 220 may be similar to those described above at step 208 with regard to the first data and step 214 with regard to the second data.

At step 221, the resource control platform 102 may normalize the first data, the second data, and the third data based on the physical space. For example, in receiving the first data, the second data, and the third data, the resource control platform 102 may receive different types of data that may each correspond to physical spaces of different sizes. As an example, the resource control platform 102 may receive weather data corresponding to a first physical space such as a zip code, traffic data corresponding to a subspace of the first physical space (e.g., a city block within the zip code), and elevator data corresponding to a subspace of the subspace of the first physical space (e.g., a floor within a building on the city block). Accordingly, at step 221, the resource control platform 102 may normalize the first data, the second data, and the third data so that is may be processed for the physical space. For example, the resource control platform 102 may normalize the first data, the second data, and the third data to each be correlated with the 11th floor of the commercial building.

At step 222, the resource control platform 102 may generate an occupancy prediction value using the normalized data from step 221. In one or more instances, the resource control platform 102 may compute a percent difference between each of the first data, the second data, and the third data, and a standard value for each corresponding dataset. For example, the resource control platform 102 may maintain a machine learning model that includes stored datasets of the same type as each of the first data, the second data, and the third data at the physical location (e.g., may include weather, traffic, elevator, or the like). In some instances, these stored datasets may correspond to a predetermined period of time (e.g., a week, month, year, or the like). In this example, the resource control platform 102 may identify, using the machine learning model, a percent difference for the first data based on the stored dataset of the same data type as the first data. As a specific example, the resource control platform 102 may identify, using the first data, that the actual outdoor temperature where the 11th floor of the commercial building is located is 76 degrees Fahrenheit and an average temperature of this location is 72 degrees Fahrenheit (e.g., based on the stored dataset of weather data). Accordingly, the resource control platform 102 may compute a percent difference of 5.6% or 0.056 (e.g., % difference=(76-72)/72=0.056). Accordingly, the resource control platform 102 may compute that a value of X equals 0.056. Similarly, if the resource control platform 102 had identified an actual temperature of 68 degrees Fahrenheit, the resource control platform 102 may have computed a percent difference of −5.6% or −0.056. For example, in some instances, individuals may be more likely to attend work at their offices if the weather is nice (e.g., not too cold, no inclement weather, or the like).

Similarly, the resource control platform 102 may compute a percent difference for the second data. For example, the resource control platform 102 may maintain, as part of the machine learning model, a stored dataset corresponding to traffic data. In this example, the resource control platform 102 may identify a percent difference of 100% or 1 based on the stored dataset of traffic data (e.g., indicating that there is slightly less traffic than usual). In some instances, the traffic data may correspond to an average time to move from one location to another (e.g., intersection to intersection) on a block, or the like. Accordingly, the resource control platform 102 may compute that a value of Y equals 1. For example, in some instances, individuals may be more likely to be en route to the office if traffic is heavy than if there are no cars on the road (e.g., which may indicate that people are staying home that day).

Similarly, the resource control platform 102 may compute a percent difference for the third data. For example, the resource control platform 102 may maintain, as part of the machine learning model, a stored dataset corresponding to elevator data (e.g., how many people typically get off at the 11th floor, or the like). In this example, the resource control platform 102 may identify a percent difference of 0 based on the stored dataset of elevator data (e.g., indicating than an average number of people are getting off at this floor). Accordingly, the resource control platform 102 may compute that a value of Z equals 0.

In one or more instances, the resource control platform 102 may maintain different datasets for different datatypes at different types (e.g., weekday vs. weekend, morning vs. midday or evening, or the like). In some instances, within the machine learning model, the resource control platform 102 may maintain weighting values for each datatype. These weighting values may similarly vary based on geographical region, day, time, month, or the like, and may be dynamically adjusted based on feedback. For example, the resource control platform 102 may identify, using the machine learning model, that a weighting value of 0.2 should be applied to X, a weighting value of 0.3 should be applied to Y, and a weighting value of 0.5 should be applied to Z (e.g., because the machine learning model may identify that elevator data is a better predictor than both weather and traffic, and that weather is a worse predictor than both elevator data and traffic). Accordingly, the resource control platform 102 may identify the following values: $\alpha=0.2$, $\beta=0.3$, and $\gamma=0.5$.

In one or more instances, the resource control platform 102 may maintain different baseline occupancy factors for the physical location (e.g., based on time, day, date, holidays, or the like) within the machine learning model. For example, the resource control platform 102 may maintain the following relationships between time and baseline occupancy factors on Mondays in April for the 11th floor of the commercial building, as illustrated in the following table:

| Time | Baseline Occupancy Factor (M) |
|---|---|
| 12:00 AM | 0 |
| 3:00 AM | 0 |
| 6:00 AM | 5 |
| 9:00 AM | 25 |
| 12:00 PM | 35 |
| 3:00 PM | 30 |
| 6:00 PM | 10 |
| 9:00 PM | 1 |
| 12:00 AM | 0 |

Accordingly, assuming that it is 12:00 PM, on a Monday in April, the resource control platform 102 may compute that M=35. In addition, the resource control platform 102 may compute a value of n representing the number of available data sources. For example, in this example, the resource control platform 102 would compute a value of 3 for n based on first remote data host system 104, second remote data host system 105, and local data host system 106.

After identifying and/or computing the values of X, Y, Z, M, $\alpha$, ($\beta$, $\gamma$, and n, the resource control platform 102 may apply one or more machine learning algorithms to compute an occupancy prediction value. For example, the resource control platform 102 may apply the following equation to compute $V_{op}$ using the following equation:

$$V_{op} = \left(\left(\frac{\alpha X + \beta Y + \gamma Z}{n}\right) + 1\right) * M$$

Accordingly, to track the example described above, the resource control platform 102 may compute that $$V_{op} = \left(\left(\frac{(.2*.056) + (.3*1) + (.5*0)}{3}\right) + 1\right) * 35 = 39.8 \approx 40$$

(e.g., building occupancy is predicted to be higher than average under the current conditions).

In some instances, this computation might not result in an exact occupancy value, however, it may be a ballpark estimation that was determined quickly and inexpensively by the resource control platform 102 in real time without using personalized data.

Referring to FIG. 2E, at step 223, the resource control platform 102 may generate one or more resource control commands directing the local control system 103 to perform a resource control action based on the occupancy prediction value computed at step 222. For example, the resource control platform 102 may generate one or more commands directing the local control system 103 to modify a setting, level, or the like of an HVAC corresponding to the physical location. For example, if the resource control platform 102 identified that the occupancy prediction value exceeds the baseline occupancy factor, the resource control platform 102 may direct local control system 103 to turn on an HVAC system and/or increase an output level of air conditioning to maintain an specified indoor temperature (e.g., as more people occupy a space, the temperature may naturally increase). In contrast, if the resource control platform 102 determines that the value does not exceed the baseline occupancy factor, the resource control platform 102 may direct local control system 103 to turn off an HVAC system and/or decrease an output level of air conditioning. Additionally or alternatively, the resource control platform 102 may generate one or more resource control commands directing the local control system 103 to dispatch alerts to enterprise user devices corresponding to employees of an enterprise organization occupying the physical space and directing the employees to particular locations (e.g., directing janitorial or other resources to particular floors, police officers to particular parts of town, employees to particular workspaces, or the like). For example, if the resource control platform 102 computed an occupancy prediction value that did not exceed the baseline occupancy factor for a particular part of a city, the resource control platform 102 may generate commands directing a local control system 103 to dispatch police to a different, more populated part of the city.

At step 224, the resource control platform 102 may establish a connection with local control system 103. For example, the resource control platform 102 may establish a fourth wireless data connection with local control system 103 to link the resource control platform 102 to the local control system 103. In some instances, the resource control platform 102 may identify whether a connection is already established with the local control system 103. If a connection is already established with the local control system 103, the resource control platform 102 might not re-establish the connection. If a connection is not already established, however, with the local control system 103, the resource control platform 102 may establish the fourth wireless data connection as described herein.

At step 225, the resource control platform 102 may send the one or more resource control commands directing the local control system 103 to perform a resource control action based on the occupancy prediction value to the local control system 103. In some instances, the resource control platform 102 may send the one or more resource control commands directing the local control system 103 to perform a resource control action based on the occupancy prediction value via the communication interface 113 and while the fourth wireless data connection is established. For example, the resource control platform 102 may send commands directing the local control system 103 to adjust a level or setting of an HVAC in the physical space (e.g., the 11th floor of the commercial building).

At step 226, the local control system 103 may receive the one or more resource control commands directing the local control system 103 to perform a resource control action based on the occupancy prediction value. In one or more instances, the local control system 103 may receive the one or more resource control commands directing the local control system 103 to perform a resource control action based on the occupancy prediction value while the fourth wireless data connection is established.

At step 227, the local control system 103 may initiate a resource control action. For example, the local control system 103 may initiate a resource control action in response to the one or more resource control commands directing the local control system 103 to perform a resource control action based on the occupancy prediction value, received at step 226. In one or more instances, in initiating the resource control action, the local control system 103 may cause an adjustment to a setting or level of a local system such as an HVAC, lighting system, or the like. Additionally or alternatively, in initiating the resource control action, the local control system 103 may send and/or display one or more messages, alerts, or the like to enterprise user devices associated with individuals, and these messages may cause human resources to be dispatched based on the occupancy prediction value (e.g., janitorial resources (e.g., clean this floor first, or the like), security professionals, law enforcement officers, emergency responders, or the like (e.g., patrol this area instead, or the like), employees (e.g., work in this location, or the like), or the like). In some instances, in sending and/or displaying the one or more messages, alerts, or the like the local control system 103 and/or an enterprise user device may display a graphical user interface similar to graphical user interface 405 or graphical user interface 505, which are shown in FIGS. 4 and 5 respectively. For example, in some instances, the graphical user interface may have a link to navigational guidance directing human resources (e.g., security professionals, law enforcement officers, emergency responders, or the like), to a particular location.

Figure 2F:
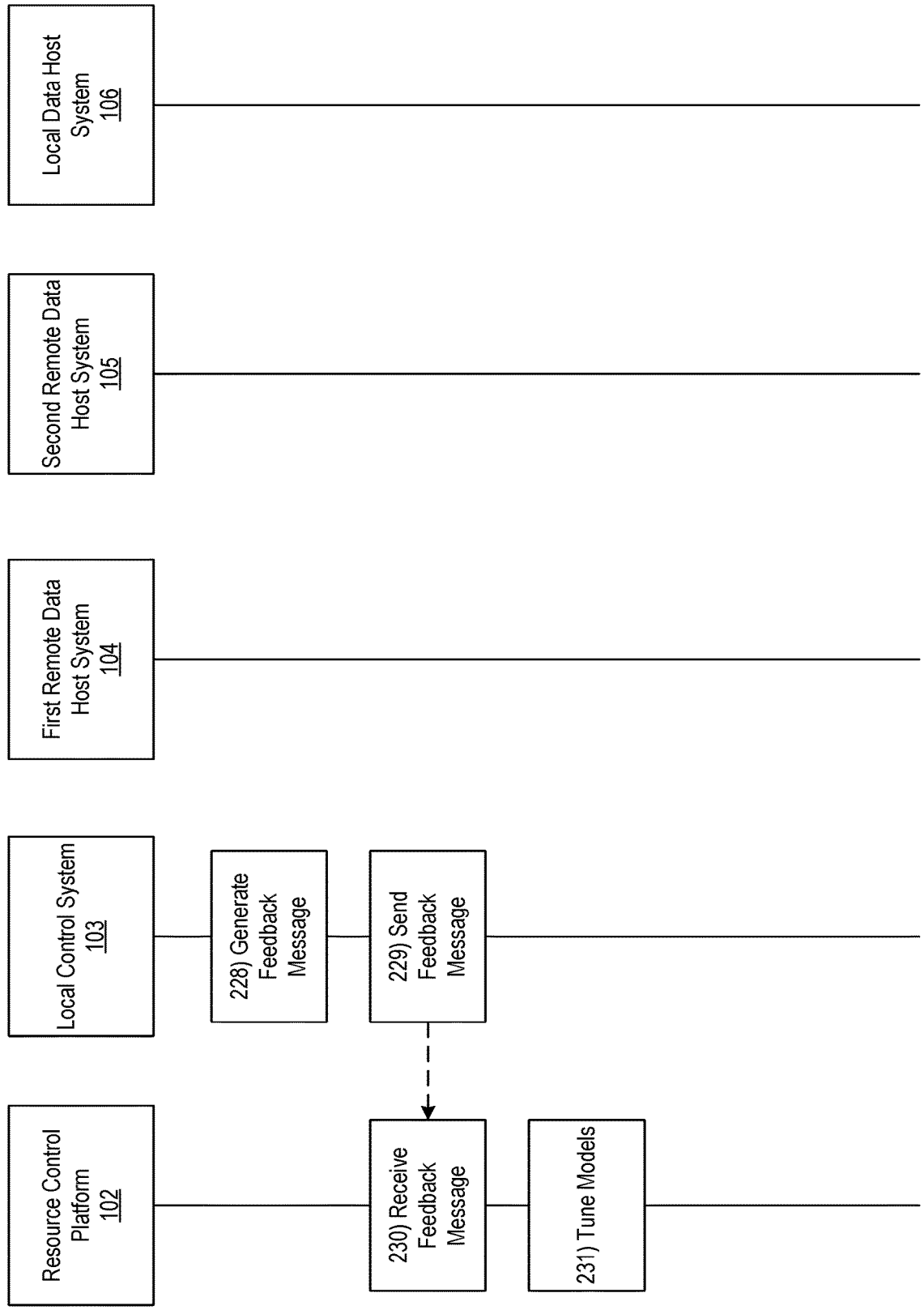

Referring to FIG. 2F, at step 228, the local control system 103 may generate a feedback message indicating whether or not the resource control action resulted in a positive change. In one or more instances, the feedback message may be generated based on user input received at an enterprise user device (e.g., from an employee of an enterprise organization occupying the physical space). For example, the local control system 103 may have directed an HVAC to increase a level of cool air flow (e.g., due to an above average occupancy) to maintain a desired temperature. In this example, the local control system 103 may receive user input (e.g., either at the local control system 103 or from an enterprise user device) indicating that the temperature in the physical space has dropped below a temperature threshold and that the level of cool air flow should actually be decreased (e.g., the resource control platform 102 overcompensated). Additionally or alternatively, the local control system 103 may automatically determine the feedback message using sensor data (e.g., collected at the local control system 103, received from additional sensors, or the like). For example, the local control system 103 may determine that the temperature dropped below the temperature threshold based on received sensor data. In these examples, the local control system 103 may generate a feedback message indicating that the HVAC levels were too heavily adjusted based on the predicted occupancy value.

At step 229, the local control system 103 may send the feedback message to the resource control platform 102. In one or more instances, the local control system 103 may send the feedback message to the resource control platform 102 while the fourth wireless data connection is established.

At step 230, resource control platform 102 may receive the feedback message sent at step 229. In one or more instances, the resource control platform 102 may receive the feedback message via the communication interface 113 and while the fourth wireless data connection is established.

At step 231, the resource control platform 102 may tune the machine learning model, used to compute the predicted occupancy value, to improve performance of the machine learning model. For example, the resource control platform 102 may tune one or more of the weighting values, the baseline occupancy factor, or the like, to increase accuracy of the machine learning model. For example, the resource control platform 102 may receive a feedback message indicating that the HVAC was over adjusted, and the resource control platform 102 may identify that elevator usage was heavily weighted (e.g., given a weighting value of 0.5) in the calculation of the occupancy prediction value. In this example, the resource control platform 102 may reduce the weighting value corresponding with the elevator data and increase the weighting value corresponding to, for example, traffic data.

Although steps 201-231 primarily describe a local control system 103, first remote data host system 104, second remote data host system 105, and local data host system 106, it should be understood that any number of local control systems, remote data host systems, and/or local data host systems may be implemented to perform one or more of the methods described herein. In addition, although first data, second data, and third data are described, it should be understood that any number of data types may be included in the predicted occupancy value calculation. Furthermore, although the example described above relates to commercial buildings, it should be understood that one or more of the systems or methods described above may apply to residential properties as well. In these instances, the resource control platform 102 may identify an interrelationship between residential occupancy and office occupancy (e.g., when people are not at home they are at the office and vice versa). In addition, although steps above are described primarily in terms of occupancy prediction for energy usage, it should be understood that the occupancy prediction values may be used by individuals to determine when to sell solar energy to the grid (e.g., occupancy predictions may affect the price of electricity, or the like).

Figure 3:
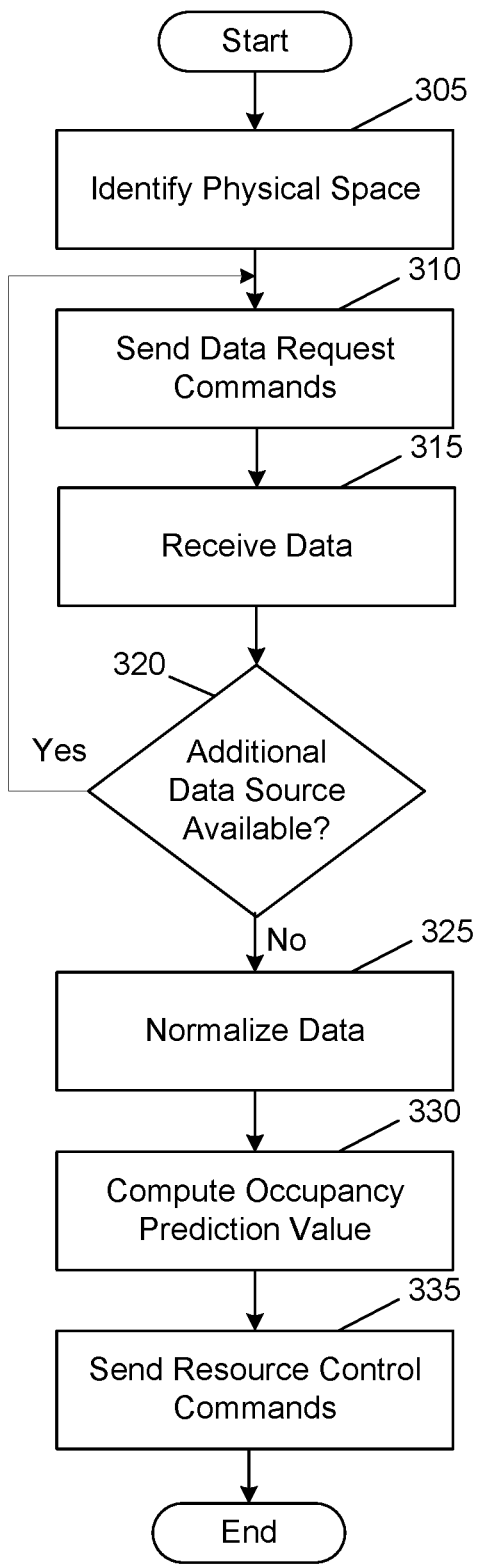
FIG. 3 depicts an illustrative method for implementing machine learning techniques for dynamic occupancy forecasting in accordance with one or more example embodiments.

FIG. 3 depicts an illustrative method for implementing machine learning techniques for dynamic occupancy forecasting in accordance with one or more example embodiments. Referring to FIG. 3, at step 305, a computing platform having at least one processor, a communication interface, and memory may identify a physical space. At step 310, the computing platform may send one or more commands directing a data source to provide data corresponding to the physical space. At step 315, the computing platform may receive the requested data. At step 320, the computing platform may identify whether another data source is available. If another data source is available, the computing platform may return to step 310. If another data source is not available, the computing platform may proceed to step 325.

At step 320, the computing platform may normalize the received data. At step 330, the computing platform may compute an occupancy prediction value. At step 335, the computing platform may send one or more commands directing a local control system 103 to perform a resource control action.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform comprising:
at least one processor;
a communication interface communicatively coupled to the at least one processor; and memory storing computer-readable instructions that, when executed by the at least one processor, cause the computing platform to:
receive first data from a first data source, wherein the first data is non-personalized and is associated with a first specific physical space;
receive second data from a second data source, wherein the second data is non-personalized and is associated with a second specific physical space;
receive third data from a third data source, wherein the third data is non-personalized and is associated with a third specific physical space;
normalize, for a common subspace of the first specific physical space and the second specific physical space, the first data and the second data;
generate, using the normalized data, a predicted occupancy value for the common subspace of the first specific physical space and the second specific physical space, wherein generating the predicted occupancy value for the common subspace of the first specific physical space and the second specific physical space comprises computing a value of $V_{op}$ using the following equation:

$$V_{op} = \left(\left(\frac{\alpha X + \beta Y + \gamma Z}{n}\right) + 1\right) * M,$$

wherein:
α is a first weight value,
X is a percent difference between the first data and a historical average for the first data,
β is a second weight value,
Y is a percent difference between the second data and a historical average for the second data,
γ is a third weight value,
Z is a percent difference between the third data and a historical average for the third data,
n is a number of data sources, and
M is a baseline occupancy factor for the common subspace of the first specific physical space and the second specific physical space; and
controlling a local heating, ventilation, and air conditioning (HVAC) control system, deployed at the common subspace of the first specific physical space and the second specific physical space, to perform, based on the predicted occupancy value, a resource control action for the common subspace of the first specific physical space and the second specific physical space, wherein performing the resource control action comprises adjusting an HVAC setting.

2. The computing platform of claim 1, wherein adjusting the HVAC setting comprises directing the HVAC control system to adjust the HVAC setting for the common subspace of the first specific physical space and the second specific physical space.

3. The computing platform of claim 1, wherein the memory stores additional computer-readable instructions that, when executed by the at least one processor, further cause the computing platform to:
receive a feedback message from the local HVAC control system, and
dynamically tune α, β, and γ based on the feedback message.

4. The computing platform of claim 1, wherein the first data comprises weather data, the second data comprises traffic data, and the third data comprises elevator data.

5. The computing platform of claim 1, wherein the common subspace of the first specific physical space and the second specific physical space comprises a floor in a commercial building.

6. The computing platform of claim 1, wherein the memory stores additional computer-readable instructions that, when executed by the at least one processor, further cause the computing platform to:
send one or more additional commands directing another local control system to send alerts to enterprise computing devices corresponding to one or more individuals, wherein the alerts cause dispatch of the one or more individuals within the common subspace of the first specific physical space and the second specific physical space based on the predicted occupancy value.

7. A method comprising:
at a computing platform comprising at least one processor, a communication interface, and memory:
receiving first data from a first data source, wherein the first data is non-personalized and is associated with a first specific physical space;
receiving second data from a second data source, wherein the second data is non-personalized and is associated with a second specific physical space;
receiving third data from a third data source, wherein the third data is non-personalized and is associated with a third specific physical space;
normalizing, for a common subspace of the first specific physical space and the second specific physical space, the first data and the second data;
generating, using the normalized data, a predicted occupancy value for the common subspace of the first specific physical space and the second specific physical space, wherein generating the predicted occupancy value for the common subspace of the first specific physical space and the second specific physical space comprises computing a value of $V_{op}$ using the following equation:

$$V_{op} = \left(\left(\frac{\alpha X + \beta Y + \gamma Z}{n}\right) + 1\right) * M,$$

wherein:
α is a first weight value,
X is a percent difference between the first data and a historical average for the first data,
β is a second weight value,
Y is a percent difference between the second data and a historical average for the second data,
γ is a third weight value,
Z is a percent difference between the third data and a historical average for the third data,
n is a number of data sources, and
M is a baseline occupancy factor for the common subspace of the first specific physical space and the second specific physical space; and
controlling a local heating, ventilation, and air conditioning (HVAC) control system, deployed at the common subspace of the first specific physical space and the second specific physical space, to perform, based on the predicted occupancy value, a resource control action for the common subspace of the first specific physical space and the second specific physical space, wherein performing the resource control action comprises adjusting an HVAC setting.

8. The method of claim 7, wherein adjusting the HVAC setting comprises directing the HVAC control system to adjust the HVAC setting for the common subspace of the first specific physical space and the second specific physical space.

9. The method of claim 7, further comprising:
receiving a feedback message from the local HVAC control system, and
dynamically tuning α, β, and γ based on the feedback message.

10. The method of claim 7, wherein the first data comprises weather data, the second data comprises traffic data, and the third data comprises elevator data.

11. The method of claim 7, wherein the common subspace of the first specific physical space and the second specific physical space comprises a floor in a commercial building.

12. The method of claim 7, further comprising:
sending one or more additional commands directing another local control system to send alerts to enterprise computing devices corresponding to one or more individuals, wherein the alerts cause dispatch of the one or more individuals within the common subspace of the first specific physical space and the second specific physical space based on the predicted occupancy value.

13. One or more non-transitory computer-readable media storing instructions that, when executed by a computing platform comprising at least one processor, a communication interface, and memory, cause the computing platform to:
receive first data from a first data source, wherein the first data is non-personalized and is associated with a first specific physical space;
receive second data from a second data source, wherein the second data is non-personalized and is associated with a second specific physical space;
receive third data from a third data source, wherein the third data is non-personalized and is associated with a third specific physical space;
normalize, for a common subspace of the first specific physical space and the second specific physical space, the first data and the second data;
generate, using the normalized data, a predicted occupancy value for the common subspace of the first specific physical space and the second specific physical space, wherein generating the predicted occupancy value for the common subspace of the first specific physical space and the second specific physical space comprises computing a value of $V_{op}$ using the following equation:

$$V_{op} = \left(\left(\frac{\alpha X + \beta Y + \gamma Z}{n}\right) + 1\right) * M,$$

wherein:
α is a first weight value,
X is a percent difference between the first data and a historical average for the first data,
β is a second weight value,
Y is a percent difference between the second data and a historical average for the second data,
γ is a third weight value,
Z is a percent difference between the third data and a historical average for the third data,
n is a number of data sources, and
M is a baseline occupancy factor for the common subspace of the first specific physical space and the second specific physical space; and
controlling a local heating, ventilation, and air conditioning (HVAC) control system, deployed at the common subspace of the first specific physical space and the second specific physical space, to perform, based on the predicted occupancy value, a resource control action for the common subspace of the first specific physical space and the second specific physical space, wherein performing the resource control action comprises adjusting an HVAC setting.

14. The one or more non-transitory computer-readable media of claim 13, wherein adjusting the HVAC setting comprises directing the HVAC control system to adjust an HVAC setting for the common subspace of the first specific physical space and the second specific physical space.

* * * * *